(12) United States Patent
Stephens et al.

(10) Patent No.: US 9,317,538 B1
(45) Date of Patent: Apr. 19, 2016

(54) METHODS FOR GENERATING DATA SETS USING CATALOG ENTRIES

(71) Applicant: CA, Inc., Islandia, NY (US)

(72) Inventors: William Stephens, Yucaipa, CA (US); Marjory Montgomery, Colton, CA (US); Nancy'e Fitzsimmons, Islandia, NY (US)

(73) Assignee: CA, INC., New York, NY (US)

( * ) Notice: Subject to any disclaimer, the term of this patent is extended or adjusted under 35 U.S.C. 154(b) by 277 days.

(21) Appl. No.: 14/022,747

(22) Filed: Sep. 10, 2013

(51) Int. Cl.
*G06F 17/00* (2006.01)
*G06F 17/30* (2006.01)

(52) U.S. Cl.
CPC .............................. *G06F 17/30289* (2013.01)

(58) Field of Classification Search
CPC ................................................ G06F 17/30289
USPC ........................................................ 707/665
See application file for complete search history.

(56) References Cited

U.S. PATENT DOCUMENTS

| | | | | |
|---|---|---|---|---|
| 4,644,468 | A * | 2/1987 | Doster | H04L 29/00 709/220 |
| 5,546,557 | A * | 8/1996 | Allen et al. | 711/111 |
| 6,012,032 | A * | 1/2000 | Donovan et al. | 705/40 |
| 6,199,074 | B1 * | 3/2001 | Kern et al. | |
| 6,199,146 | B1 * | 3/2001 | Pence | 711/154 |
| 6,304,980 | B1 * | 10/2001 | Beardsley et al. | 714/6.23 |
| 6,336,172 | B1 * | 1/2002 | Day et al. | 711/161 |
| 6,557,089 | B1 * | 4/2003 | Reed et al. | 711/162 |
| 6,598,134 | B2 * | 7/2003 | Ofek et al. | 711/162 |
| 6,718,352 | B1 * | 4/2004 | Dang et al. | 707/611 |
| 6,732,244 | B2 * | 5/2004 | Ashton et al. | 711/162 |
| 6,772,303 | B2 * | 8/2004 | Crockett et al. | 711/162 |
| 6,832,287 | B2 * | 12/2004 | Beeston et al. | 711/111 |
| 7,020,532 | B2 * | 3/2006 | Johnson | G05B 19/042 700/1 |
| 7,529,784 | B2 * | 5/2009 | Kavuri et al. | |
| 7,631,220 | B1 * | 12/2009 | Hamilton et al. | 714/15 |
| 8,042,107 | B2 * | 10/2011 | Amodio et al. | 717/175 |
| 8,060,776 | B1 * | 11/2011 | Schoenthal | G06F 11/2069 711/162 |
| 8,165,221 | B2 * | 4/2012 | Zheng et al. | 375/240.26 |
| 8,281,066 | B1 * | 10/2012 | Trimmer et al. | 711/103 |
| 8,291,183 | B2 * | 10/2012 | McCloskey et al. | 711/162 |
| 2006/0155776 | A1 * | 7/2006 | Aust | G06F 17/30067 |
| 2007/0113157 | A1 * | 5/2007 | Perego | 714/770 |
| 2008/0059745 | A1 * | 3/2008 | Tsukada et al. | 711/165 |
| 2009/0103432 | A1 * | 4/2009 | Trikoz | G06F 11/2007 370/228 |
| 2009/0276771 | A1 * | 11/2009 | Nickolov | G06F 9/4856 717/177 |
| 2010/0180093 | A1 * | 7/2010 | Huber et al. | 711/162 |
| 2011/0153965 | A1 * | 6/2011 | Haustein et al. | 711/162 |
| 2011/0283077 | A1 * | 11/2011 | Cammarata et al. | 711/170 |
| 2013/0054924 | A1 * | 2/2013 | Dudgeon et al. | 711/170 |

OTHER PUBLICATIONS

Satyanarayanan, M., et al., "Coda File System User and System Administrator's Manual", (c) 2000 Coda Team, Carnegie Mellon University, 82 pages.*

* cited by examiner

*Primary Examiner* — Robert Stevens
(74) *Attorney, Agent, or Firm* — Vierra Magen Marcus LLP

(57) ABSTRACT

Methods for recovering data sets using existing catalog entries are described. The data sets to be recovered may correspond with a portion of a data storage volume that has been archived. In some embodiments, an archived data set may be re-cataloged to a pseudo-volume in order to preserve catalog sequencing information for data sets that are members of the data set. In some embodiments, a data storage system may utilize a system interrupt to detect that a request to create a new data set has failed due to a conflict with an existing catalog entry, acquire data set creation parameters associated with the request to create the new data set, and issue a catalog alter command using the data set creation parameters in response to detecting that the request to create the new data set has failed.

20 Claims, 5 Drawing Sheets

METHODS FOR GENERATING DATA SETS USING CATALOG ENTRIES

BACKGROUND

The present disclosure relates to methods for recovering data sets using existing catalog entries.

Tiered storage techniques allow for the movement of data across different tiers of a data storage infrastructure between higher-cost, higher-performance storage devices (e.g., hard disk drives) and relatively lower-cost, lower-performance storage devices (e.g., magnetic tape drives). A tiered storage management system (or hierarchical storage management system) typically has the ability to move data dynamically between different storage devices based on predictions regarding which data will be most frequently requested or used in the future. Data that has not been requested or used within a certain period of time (e.g., after one week or month) may be archived (or migrated) to a lower-cost storage device.

Some operating systems for supporting systems that perform high-volume transaction processing, such as z/OS from IBM®, manage data by means of data sets. A data set may comprise a text or binary file that includes data, such as one or more records (e.g., medical records or insurance records) used by a program running on the system. A data set may also be used to store information needed by applications running on the system (e.g., source programs or macro libraries) or by the operating system itself (e.g., system variables).

The location of an existing data set may be determined if the data set name and a corresponding data storage volume are known. A data storage volume (or volume) may comprise a unit of a data storage device that is separately addressable and may be identified by a volume identifier (e.g., a six-character volume serial number or VOLSER). In some cases, if the data set is cataloged, then only the data set name is required in order to locate the data set. However, a cataloged data set may require that the data set have a unique name or identifier. A catalog may describe various data set attributes and provide a mapping to the storage devices or volumes on which the data set is located. In some cases, a catalog and a volume table of contents (VTOC) may reside on a direct access storage device (DASD) that is mounted during operation of the system. The VTOC may list the data sets that reside on the DASD, along with information about the location and size of each of the data sets on the DASD. The system may have a master catalog containing entries for each of the catalogs that are used on the system including pointers to the catalogs. During a system initialization, the master catalog may be read to acquire system-level data sets and to determine the location of the catalogs.

BRIEF SUMMARY

According to one aspect of the present disclosure, technology for recovering data sets using existing catalog entries is disclosed.

Technology for recovering data sets that have been archived using existing catalog entries is described. The data sets to be recovered may correspond with a portion of a data storage volume that has been archived (e.g., to free up space on a DASD). In some embodiments, an archived data set may be re-cataloged to a pseudo-volume in order to preserve catalog sequencing information for data sets that are members of the data group. As some system level storage management software may not allow the creation of a new data set if an entry for the new data set already exists in a catalog, a data storage system may bypass these limitations by utilizing a system interrupt to detect that a request to create a new data set has failed due to a duplicate name already existing in the catalog, acquire data set creation parameters associated with the request to create the new data set, and issue a catalog alter request using the data set creation parameters in response to detecting that the request to create the new data set has failed.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the Background.

BRIEF DESCRIPTION OF THE DRAWINGS

Aspects of the present disclosure are illustrated by way of example and are not limited by the accompanying figures with like references indicating like elements.

DETAILED DESCRIPTION

Figure 1:
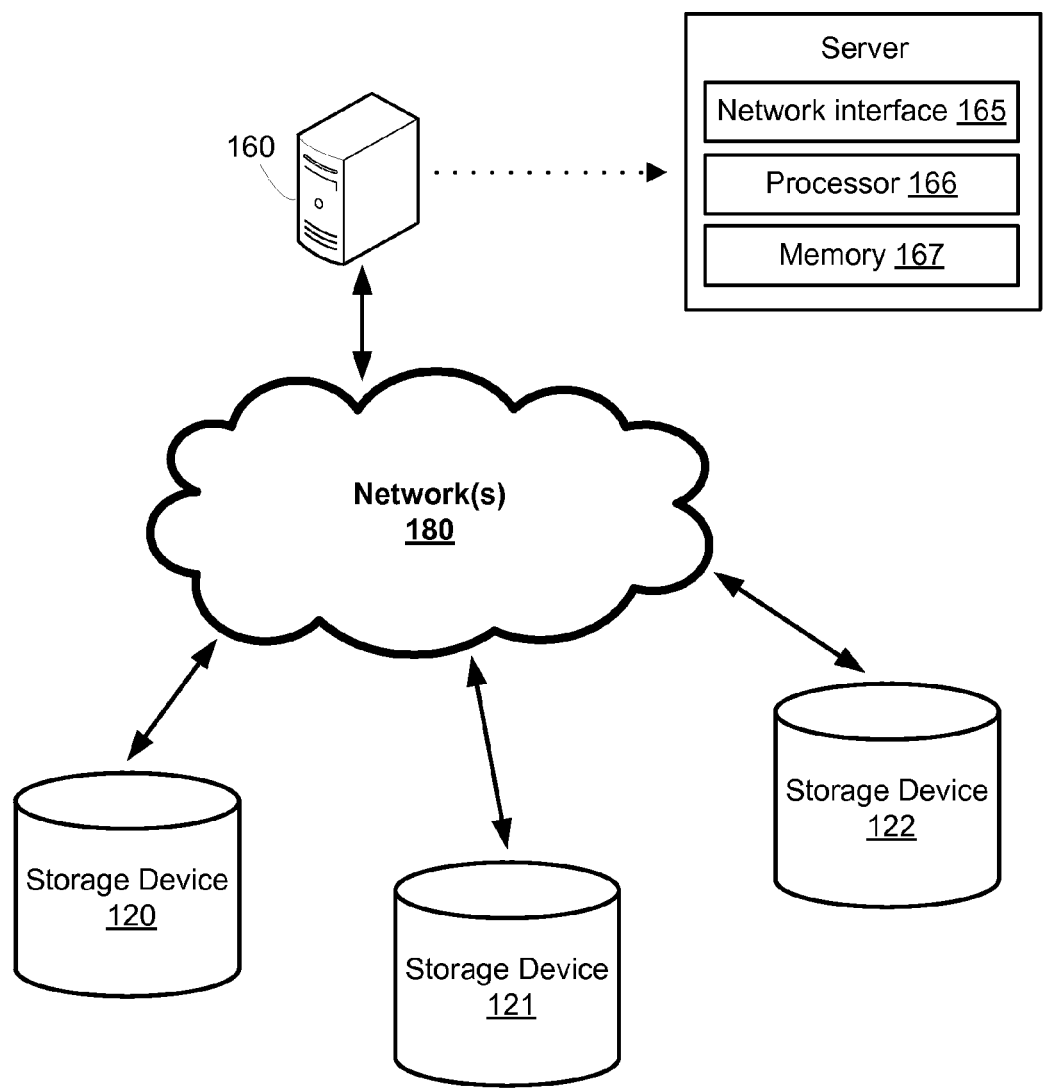
FIG. 1 depicts one embodiment of a networked computing environment.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, CII, VB.NET or the like, conventional procedural programming languages, such as the "C" programming language, Visual Basic, Fortran 2003, Perl, Python, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

Technology is described for recovering data sets that have been archived using existing catalog entries. Data groups may also be recovered. The data sets to be recovered may correspond with a portion of a data storage volume that has been archived (e.g., to free up space on a DASD). In some embodiments, an archived data set may be re-cataloged to a pseudo-volume in order to preserve catalog sequencing information for data sets that are members of the data group. In this case, a corresponding catalog entry for the archived data set may comprise a pseudo-volume identifier (e.g., a pseudo-VOLSER) that points to a pseudo-volume (i.e., a volume that is not accessible). As some system level storage management software may not allow the creation of a new data set (e.g., the creation of a new SMS data set via a dynamic allocation function) if an entry for the new data set already exists in a catalog, a data storage system may bypass these limitations by utilizing a system interrupt (e.g., a supervisor call instruction intercept routine) or hook to detect that a request to create a new data set has failed due to a duplicate name already existing in the catalog, acquire data set creation parameters associated with the request to create the new data set (e.g., the name of a data set and the one or more volumes on which the data set is stored), and issue a catalog alter request using the data set creation parameters in response to detecting that the request to create the new data set has failed. In one embodiment, the catalog alter request may alter the catalog during dynamic allocation in order to reference a volume associated with the newly created data set instead of a pseudo-volume.

In some embodiments, restoration of an archived data set may comprise receiving a restore command to restore a data set, determining a new volume for storing the data set, intercepting a catalog request to create a new entry in a catalog associated with the data set, detecting that the catalog request has failed due to a conflict with an existing catalog entry, acquiring data set creation parameters associated with the catalog request to create the new entry, and submitting a catalog alter request using the data set creation parameters in order to update the existing catalog entry to point to the new volume on which the data set is stored. In some cases, the data set may comprise a non-VSAM data set.

FIG. 1 depicts one embodiment of a networked computing environment 100 in which the disclosed technology may be practiced. Networked computing environment 100 includes a plurality of storage devices interconnected through one or more networks 180. The one or more networks 180 allow a particular computing device, such as server 160, to connect to and communicate with the plurality of storage devices or another computing device not depicted. The depicted storage devices include storage devices 120-122. Storage devices 120-122 may comprise a tiered data storage infrastructure (or a portion of a tiered data storage infrastructure). In one example, storage device 120 may comprise a hard disk drive, storage device 121 may comprise a magnetic tape drive, and storage device 122 may comprise a solid-state drive. In some cases, a tiered data storage infrastructure may include redundant arrays of independent disks and/or storage area networks. The one or more networks 180 may include a secure network such as an enterprise private network, an unsecure network such as a wireless open network, a local area network (LAN), a wide area network (WAN), a storage area network (SAN), and/or the Internet. Each network of the one or more networks 180 may include hubs, bridges, routers, switches, and wired transmission media such as a wired network or direct-wired connection.

Server 160 may comprise a data storage management server. In some cases, server 160 may comprise a network attached storage server, a data storage server, a network server, or a file server. In general, a "server" may include a hardware device that acts as the host in a client-server relationship or a software process that shares a resource with or performs work for one or more clients. Communication between computing devices in a client-server relationship may be initiated by a client sending a request to the server asking for access to a particular resource or for particular work to be performed. The server may subsequently perform the actions requested and send a response back to the client.

One embodiment of server 160 includes a network interface 165, processor 166, and memory 167, all in communication with each other. Network interface 165 allows server 160 to connect to one or more networks 180. Network interface 165 may include a wireless network interface, a modem, and/or a wired network interface. Processor 166 allows server 160 to execute computer readable instructions stored in memory 167 in order to perform processes discussed herein.

Networked computing environment 100 may provide a cloud computing environment for one or more computing devices. Cloud computing refers to Internet-based computing, wherein shared resources, software, and/or information are provided to one or more computing devices on-demand via the Internet (or other global network). The term "cloud" is used as a metaphor for the Internet, based on the cloud drawings used in computer networking diagrams to depict the Internet as an abstraction of the underlying infrastructure it represents.

In one embodiment, a data storage management server, such as server 160 in FIG. 1, may restore an archived data set by transferring information corresponding with the data set from a first storage device (e.g., a magnetic tape drive) to a second storage device (e.g., a hard disk drive). The data storage management server may intercept a catalog request to create a new entry in a catalog associated with the data set, detect that the catalog request has failed due to a conflict with an existing catalog entry, acquire data set creation parameters associated with the catalog request to create the new entry, and submit a catalog alter request using the data set creation parameters in order to update the existing catalog entry to point to the second storage device.

Figure 2:
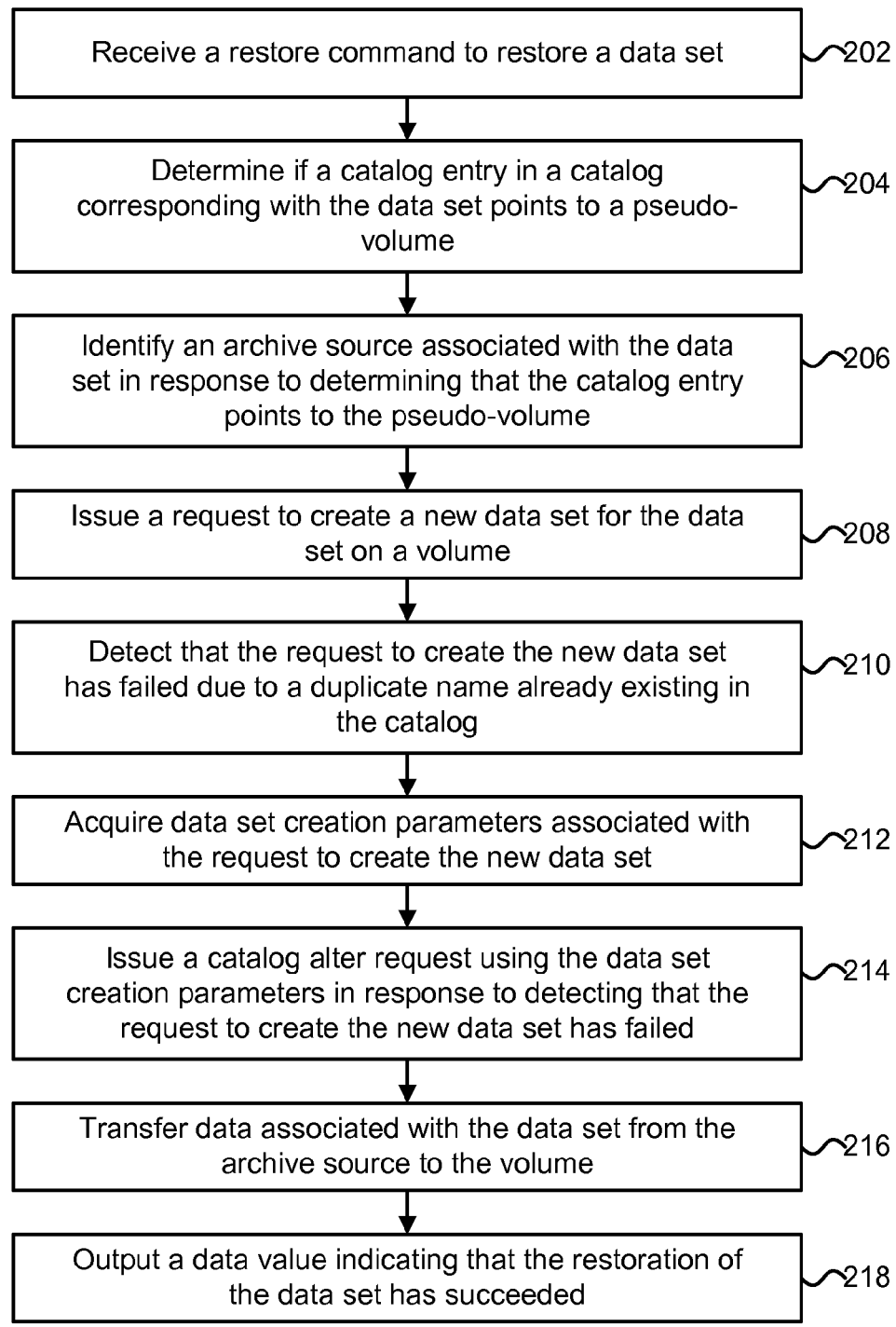
FIG. 2 is a flowchart describing one embodiment of a process for restoring a data set.

FIG. 2 is a flowchart describing one embodiment of a process for restoring a data set. In one embodiment, the process of FIG. 2 is performed by a server, such as server 160 in FIG. 1.

In step 202, a restore command to restore a data set is received. The restore command may be issued from an end user or operator of a data storage management server, such as server 160 in FIG. 1. The restore command may be automatically generated by a data retrieval application running on a data storage management server.

In some embodiments, a restore command to restore one or more data sets may be issued. The restore command may comprise a command that explicitly names one or more data sets to be restored. In other embodiments, the restore command may comprise a command that specifies one or more data sets to be restored using pattern names (like application group), regular expressions, and/or wildcards (e.g., using an asterisk sign to match zero or more characters). The restore command may also specify restrictions such as restoring only a limited number of data sets, restoring only the data sets that are in an active state or that are cataloged, or restoring only the data sets that are from a limited set of volumes.

In step 204, it is determined if a catalog entry in a catalog corresponding with the data set points to a pseudo-volume. In some cases, a pointer to a pseudo-volume (e.g., a fictitious volume identifier that points to a volume that is not accessible) may be used when a data set has been archived (e.g., to save space on a DASD) in order to preserve catalog sequencing information for the data group. The pseudo-volume may be identified via a pseudo-volume identifier (e.g., a pseudo-VOLSER). The pseudo-volume may also be identified via the setting of a flag bit corresponding with a particular catalog entry. In some embodiments, if the catalog entry corresponds with a pointer to a pseudo-volume, then a modified data recovery process may be performed in which a data storage management server may detect that a request to create a new catalog entry has failed due to a conflict with an existing catalog entry and in response issue a catalog alter request in order to update the existing catalog entry to point to a new volume corresponding with the data set.

In step 206, an archive source associated with the data set is identified in response to determining that the catalog entry points to the pseudo-volume. The archive source may comprise a magnetic tape storage device, a magnetic disk storage device, or an optical disk storage device that stores information corresponding with the data set. In step 208, a request to create a new data set for the data set on a volume is issued. In one embodiment, the volume may be associated with a DASD to which archived data may be transferred.

In step 210, it is detected that the request to create the new data set has failed due to a duplicate name already existing in the catalog. The detection of the failure of the request to create the new data set may cause a system interrupt (e.g., via a supervisor call instruction intercept routine) in which processing control is intercepted and redirected.

In step 212, data set creation parameters associated with the request to create the new data set are acquired. The data set creation parameters may include a name of a data set and a volume on which the data set is to be stored. In step 214, a catalog alter request using the data set creation parameters is issued in response to detecting that the request to create the new data set has failed. In one embodiment, the catalog alter request may be transmitted to a catalog processor. The catalog processor may comprise a portion of a data storage management application that is responsible for managing a catalog and creating, deleting, and/or altering information stored within the catalog. The catalog alter request may direct the catalog processor to modify a particular catalog entry within a catalog rather than creating a new catalog entry. The catalog entry may be identified via a name of a data set or other identification information corresponding with the data set.

In step 216, data associated with the data set is transferred from the archives source to the volume. In step 218, a data value indicating that the restoration of the data set has succeeded is outputted.

Figure 3:
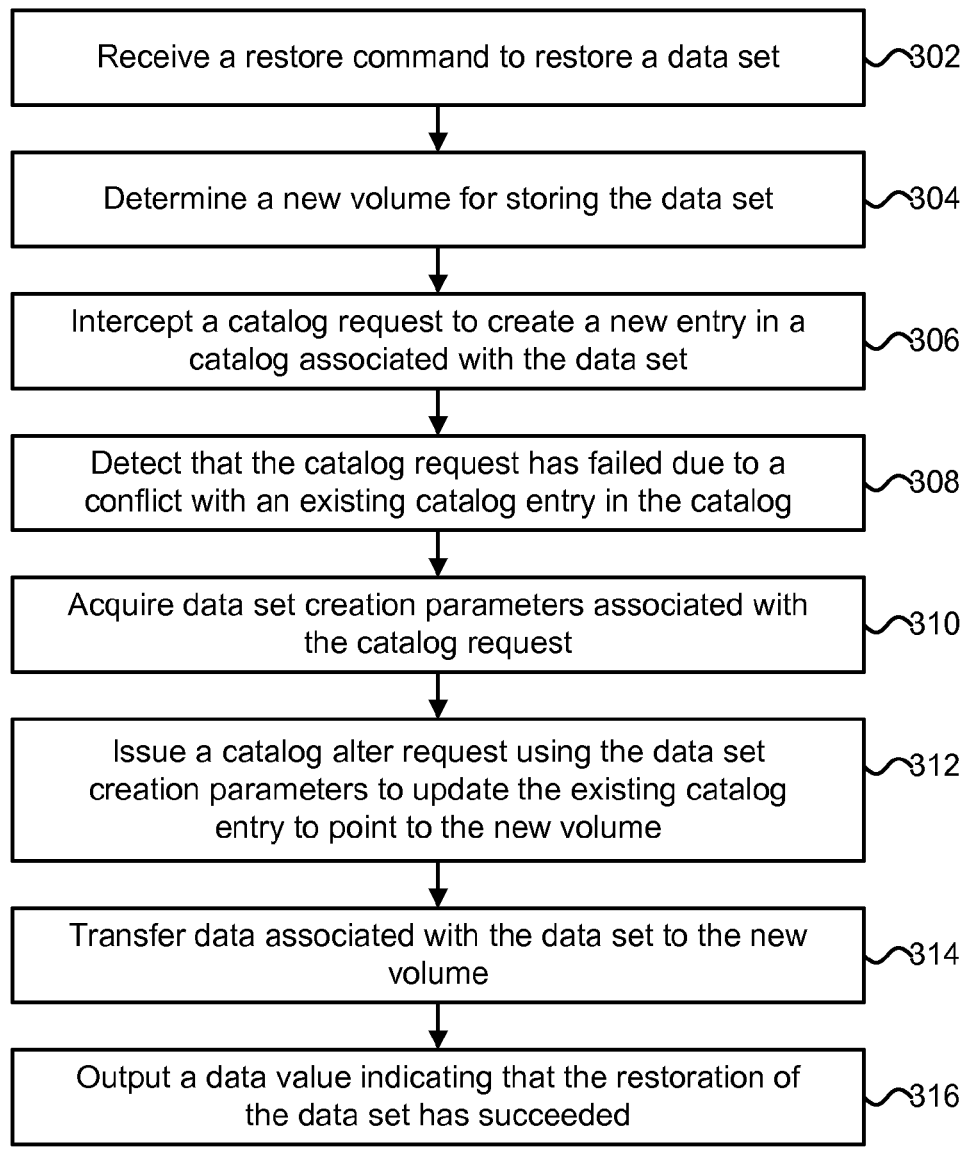
FIG. 3 is a flowchart describing an alternative embodiment of a process for restoring a data set.

FIG. 3 is a flowchart describing an alternative embodiment of a process for restoring a data set. In one embodiment, the process of FIG. 3 is performed by a server, such as server 160 in FIG. 1.

In step 302, a restore command to restore a data set is received. The restore command may be issued by a data retrieval application running on a data storage management server. In some embodiments, a restore command may specifically identify one or more data sets to be restored or identify an entire data set.

In step 304, a new volume for storing the data set is determined. The new volume may correspond with a DASD. In step 306, a catalog request to create a new entry in a catalog associated with the data set is intercepted. The catalog request may be intercepted via a system interrupt (e.g., via a supervisor call instruction intercept routine) in which processing control is intercepted and redirected.

In step 308, it is detected that the catalog request has failed due to a conflict with an existing catalog entry in the catalog. In one example, the conflicting catalog entry associated with the data set may point to a pseudo-volume. In step 310, data set creation parameters associated with the catalog request are acquired. The data set creation parameters may include a name of a data set and a volume on which the data set is stored or will eventually be stored. In step 312, a catalog alter request is issued using the data set creation parameters to update the existing catalog entry to point to the new volume. In one embodiment, the catalog alter request may be transmitted to a catalog processor. The catalog processor may comprise a portion of a data storage management application that is responsible for managing a catalog (e.g., a master catalog). The catalog alter request may direct the catalog processor to modify a particular catalog entry within a catalog rather than creating a new catalog entry. The catalog entry may be identified via a name of a data set or other identification information corresponding with the data set.

In step 314, data associated with the data set is transferred to the new volume. In step 316, a data value indicating that the restoration of the data set has succeeded is outputted.

Figure 4:
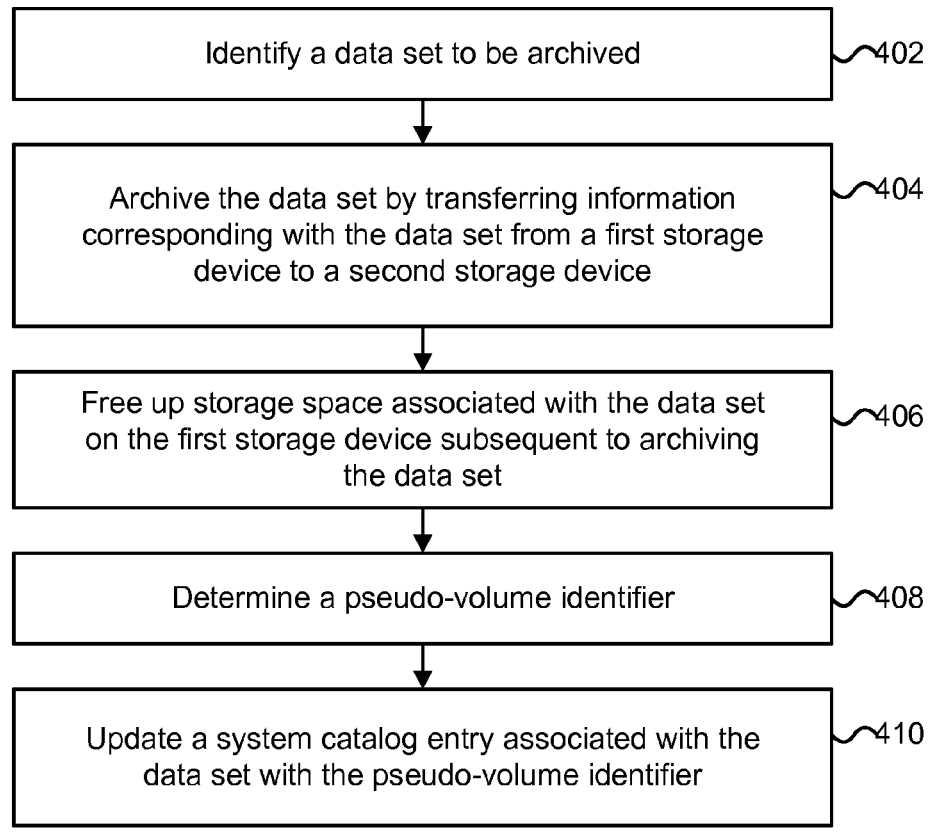
FIG. 4 is a flowchart describing one embodiment of a process for updating a catalog entry.

FIG. 4 is a flowchart describing one embodiment of a process for updating a catalog entry. In one embodiment, the process of FIG. 4 is performed by a server, such as server 160 in FIG. 1.

In step 402, a data set to be archived is identified. The data set may be identified via an archive command issued from an end user or operator of a data storage management server, such as server 160 in FIG. 1. An archive command may also be automatically generated by a data retrieval application running on a data storage management server.

In step 404, the data set is archived. The archival of the data set may comprise transferring information corresponding with the data set from a first storage device to a second storage device. The first storage device may correspond with a DASD and the second storage device may correspond with a magnetic tape drive. In step 406, storage space associated with the data set on the first storage device is freed up subsequent to transferring information corresponding with the data set to the second storage device.

In step 408, a pseudo-volume identifier is determined. The pseudo-volume identifier may comprise a pseudo-VOLSER. In one embodiment, the pseudo-volume may correspond with a predicted future volume to which a data set may eventually be brought back. The predicted future volume may be predicted based on a frequency of restoration operations associated with a plurality of storage devices. For example, the predicted future volume may correspond with a storage device of the plurality of storage devices with the highest frequency of restoration operations. A pseudo-volume may be identified via the setting of a pseudo-volume flag bit corresponding with a particular catalog entry. In step 410, a system catalog entry associated with the data set is updated with the pseudo-volume identifier.

In some embodiments, a method for restoring an archived data set may comprise receiving a recovery command to recover a data set, determining a new volume for storing the data set, and intercepting a catalog request to create a new entry in a catalog associated with the data set. The method for restoring an archived data set may further comprise detecting that the catalog request has failed due to a conflict with an existing catalog entry, acquiring data set creation parameters associated with the catalog request to create the new entry, and issuing a catalog alter request using the data set creation parameters in order to update the existing catalog entry to point to the new volume on which the data set is stored or will eventually be stored.

One embodiment comprises receiving a restore command to restore a data set, determining a new volume for storing the data set, identifying an archive source that stores data corresponding with the data set, detecting that a request to create a new data set for the data set on the new volume has failed due to a conflict with a catalog entry in a catalog of a data storage system, acquiring data set creation parameters associated with the request to create the new data set, issuing a catalog alter request using the data set creation parameters to alter the catalog entry in response to detecting that the request to create the new data set has failed, and transferring the data corresponding with the data set from the archive source to the new volume.

One embodiment comprises a data storage system comprising a first storage device, a second storage device, and a processor in communication with the first storage device and the second storage device. The first storage device stores data corresponding with a data set. The processor detects that a request to create a new data set for the data set on the second storage device has failed due to a conflict with a catalog entry in a catalog of the data storage system. The processor acquires data set creation parameters associated with the request to create the new data set and issues a catalog alter request using the data set creation parameters to alter the catalog entry in response to detecting that the request to create the new data set has failed. The processor causes the data corresponding with the data set to be transferred from the first storage device to the second storage device.

One embodiment comprises a computer program product comprising a computer readable storage medium having computer readable program code embodied therewith. The computer readable program code configured to receive a restore command to restore a data set, determine a second storage device for storing the data set, identify a first storage device that stores data corresponding with the data set, detect that a request to create a new data set for the data set on the second storage device has failed due to a duplicate name already existing in a catalog, acquire a data set creation parameter associated with the request to create the new data set, issue a catalog alter request using the data set creation parameter to alter a catalog entry of the catalog in response to detecting that the request to create the new data set has failed, and cause the data corresponding with the data set to be transferred from the first storage device to the second storage device.

Figure 5:
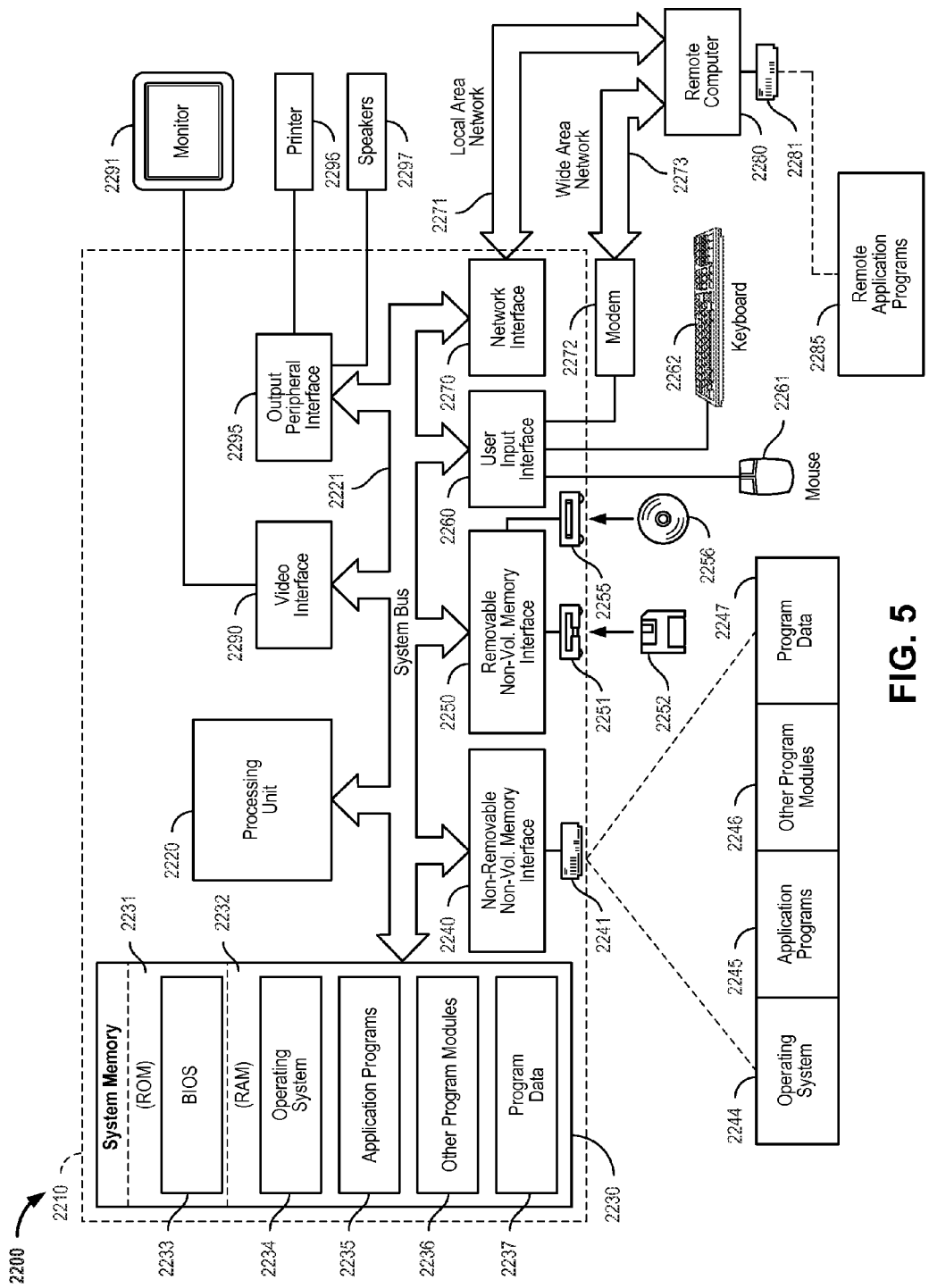
FIG. 5 is a block diagram of an embodiment of a computing system environment.

The disclosed technology may be used with various computing systems. FIG. 5 is a block diagram of an embodiment of a computing system environment 2200, such as server 160 in FIG. 1. Computing system environment 2200 includes a general purpose computing device in the form of a computer 2210. Components of computer 2210 may include, but are not limited to, a processing unit 2220, a system memory 2230, and a system bus 2221 that couples various system components including the system memory 2230 to the processing unit 2220. The system bus 2221 may be any of several types of bus structures including a memory bus, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer 2210 typically includes a variety of computer readable media. Computer readable media can be any available media that can be accessed by computer 2210 and includes both volatile and nonvolatile media, removable and non-removable media. By way of example, and not limitation, computer readable media may comprise computer storage media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 2210. Combinations of the any of the above should also be included within the scope of computer readable media.

The system memory 2230 includes computer storage media in the form of volatile and/or nonvolatile memory such as read only memory (ROM) 2231 and random access memory (RAM) 2232. A basic input/output system 2233 (BIOS), containing the basic routines that help to transfer information between elements within computer 2210, such as during start-up, is typically stored in ROM 2231. RAM 2232 typically contains data and/or program modules that are immediately accessible to and/or presently being operated on by processing unit 2220. The system memory 2230 may store operating system 2234, application programs 2235, other program modules 2236, and program data 2237.

The computer 2210 may also include other removable/non-removable, volatile/nonvolatile computer storage media. The computer 2210 may include a hard disk drive 2241 that reads from or writes to non-removable, nonvolatile magnetic media, a magnetic disk drive 2251 that reads from or writes to a removable, nonvolatile magnetic disk 2252, and an optical disk drive 2255 that reads from or writes to a removable, nonvolatile optical disk 2256 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 2241 is typically connected to the system bus 2221 through an non-removable memory interface such as interface 2240, and magnetic disk drive 2251 and optical disk drive 2255 are typically connected to the system bus 2221 by a removable memory interface, such as interface 2250.

The drives and their associated computer storage media described above provide storage of computer readable instructions, data structures, program modules and other data for the computer 2210. Hard disk drive 2241 is illustrated as storing operating system 2244, application programs 2245, other program modules 2246, and program data 2247. Note that these components can either be the same as or different from operating system 2234, application programs 2235, other program modules 2236, and program data 2237. Operating system 2244, application programs 2245, other program modules 2246, and program data 2247 are given different numbers here to illustrate that, at a minimum, they are different copies. A user may enter commands and information into computer 2210 through input devices such as a keyboard 2262 and pointing device 2261, commonly referred to as a mouse, trackball, or touch pad. Other input devices (not shown) may include a microphone, joystick, game pad, satellite dish, scanner, or the like. These and other input devices are often connected to the processing unit 2220 through a user input interface 2260 that is coupled to the system bus, but may be connected by other interface and bus structures, such as a parallel port, game port or a universal serial bus (USB). A monitor 2291 or other type of display device is also connected to the system bus 2221 via an interface, such as a video interface 2290. In addition to the monitor, computers may also include other peripheral output devices such as speakers 2297 and printer 2296, which may be connected through an output peripheral interface 2295.

The computer 2210 may operate in a networked environment using logical connections to one or more remote computers, such as a remote computer 2280. The remote computer 2280 may be a personal computer, a server, a router, a network PC, a peer device or other common network node, and typically includes many or all of the elements described above relative to the computer 2210. The logical connections may include a local area network (LAN) 2271 and a wide area network (WAN) 2273, but may also include other networks. Such networking environments are commonplace in offices, enterprise-wide computer networks, intranets and the Internet.

When used in a LAN networking environment, the computer 2210 is connected to the LAN 2271 through a network interface or adapter 2270. When used in a WAN networking environment, the computer 2210 typically includes a modem 2272 or other means for establishing communications over the WAN 2273, such as the Internet. The modem 2272, which may be internal or external, may be connected to the system bus 2221 via the user input interface 2260, or other appropriate mechanism. In a networked environment, program modules depicted relative to the computer 2210, or portions thereof, may be stored in the remote memory storage device. For example, remote application programs 2285 may reside on memory device 2281. It will be appreciated that the network connections shown are exemplary and other means of establishing a communications link between the computers may be used.

The flowchart and block diagrams in the Figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

For purposes of this document, each process associated with the disclosed technology may be performed continuously and by one or more computing devices. Each step in a process may be performed by the same or different computing devices as those used in other steps, and each step need not necessarily be performed by a single computing device.

For purposes of this document, reference in the specification to "an embodiment," "one embodiment," "some embodiments," or "another embodiment" are used to described different embodiments and do not necessarily refer to the same embodiment.

For purposes of this document, a connection can be a direct connection or an indirect connection (e.g., via another part).

For purposes of this document, the term "set" of objects, refers to a "set" of one or more of the objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for restoring a data set using a data storage system, comprising:
   determining a new volume for storing the data set;
   identifying an archive source that stores data corresponding with the data set;
   detecting that a request to create a new data set for the data set on the new volume has failed due to a duplicate name conflict with a catalog entry in a catalog of the data storage system;
   acquiring data set creation parameters associated with the request to create the new data set;
   issuing a catalog alter request using the data set creation parameters to alter the catalog entry in response to detecting that the request to create the new data set has failed due to the duplicate name conflict, the issuing the catalog alter request comprises altering the catalog entry to point to the new volume for storing the data set; and
   transferring the data corresponding with the data set from the archive source to the new volume.

2. The method of claim 1, wherein:
   the detecting that the request to create the new data set has failed comprises detecting a system interrupt associated with the failed request and passing control to a supervisor program, the issuing a catalog alter request is performed by the supervisor program.

3. The method of claim 1, wherein:
   the detecting that the request to create the new data set has failed comprises detecting that a particular supervisor call interrupt has been triggered.

4. The method of claim 1, wherein:
   the issuing a catalog alter request comprises transmitting the catalog alter request to a catalog processor of the data storage system.

5. The method of claim 1, wherein:
   the data set creation parameters comprise a name of the data set.

6. The method of claim 1, further comprising:
   archiving the data set prior to the identifying an archive source, the archiving comprises transferring the data corresponding with the data set to the archive source;
   determining a pseudo-volume identifier; and
   updating the catalog entry with the pseudo-volume identifier prior to the determining the new volume for storing the data set.

7. The method of claim 6, further comprising:
   determining if the catalog entry points to a pseudo-volume, the identifying an archive source associated with the data set is performed in response to determining that the catalog entry points to the pseudo-volume.

8. The method of claim 6, wherein:
   the pseudo-volume identifier comprises a pseudo-VOLSER.

9. The method of claim 1, wherein:
   the archive source comprises a magnetic storage device; and
   the new volume comprises a DASD.

10. The method of claim 1, wherein:
    the data storage system comprises a tiered storage system; and
    the catalog comprises a master catalog of the tiered storage system.

11. A data storage system, comprising:
    a first storage device, the first storage device stores data corresponding with a data set;
    a second storage device; and
    a set of processors in communication with the first storage device and the second storage device, the set of processors detects that a request to create a new data set for the data set on the second storage device has failed due to a duplicate name conflict with a catalog entry in a catalog of the data storage system, the set of processors acquires data set creation parameters associated with the request to create the new data set and issues a catalog alter request using the data set creation parameters to alter the catalog entry in response to detecting that the request to create the new data set has failed due to the duplicate name conflict, the catalog alter request causes the catalog entry to point to the second storage device, the set of processors causes the data corresponding with the data set to be transferred from the first storage device to the second storage device.

12. The system of claim 11, wherein:
    the set of processors detects that the request to create the new data set has failed by detecting a system interrupt associated with the failed request.

13. The system of claim 11, wherein:
    the data set creation parameters comprise a name of the data set.

14. The system of claim 11, wherein:
    the first storage device comprises a magnetic storage device;
    the second storage device comprises a DASD; and the catalog comprises a master catalog of the data storage system.

15. A computer program product, comprising:
a non-transitory computer readable storage medium having computer readable program code embodied therewith, the computer readable program code comprising:
computer readable program code configured to receive a restore command to restore a data set;
computer readable program code configured to determine a second storage device for storing the data set;
computer readable program code configured to identify a first storage device that stores data corresponding with the data set;
computer readable program code configured to detect that a request to create a new data set for the data set on the second storage device has failed due to a duplicate name already existing in a catalog;
computer readable program code configured to acquire a data set creation parameter associated with the request to create the new data set;
computer readable program code configured to issue a catalog alter request using the data set creation parameter to alter a catalog entry of the catalog in response to detecting that the request to create the new data set has failed due to the duplicate name already existing in the catalog, the catalog alter request causes the catalog entry to point to the second storage device; and
computer readable program code configured to cause the data corresponding with the data set to be transferred from the first storage device to the second storage device.

16. The computer program product of claim 15, wherein:
the computer readable program code configured to detect that a request to create a new data set for the data set on the second storage device has failed comprises computer readable program code configured to detect a system interrupt associated with the failed request and pass programming control to a supervisor program for issuing the catalog alter request.

17. The computer program product of claim 15, wherein:
the computer readable program code configured to detect that a request to create a new data set for the data set on the second storage device has failed comprises computer readable program code configured to detect that a particular supervisor call interrupt has been triggered.

18. The computer program product of claim 15, wherein the computer readable program code further comprises:
computer readable program code configured to determine if the catalog entry points to a pseudo-volume, the computer readable program code configured to identify a first storage device is executed in response to determining that the catalog entry points to the pseudo-volume.

19. The computer program product of claim 15, wherein:
the data set creation parameter comprises a name of the data set.

20. The computer program product of claim 15, wherein:
the first storage device comprises a magnetic storage device; and
the second storage device comprises a DASD.

* * * * *